(12) United States Patent  (10) Patent No.: US 7,484,661 B2
Shinkai  (45) Date of Patent: Feb. 3, 2009

(54) POINT-OF-SALES TERMINAL AND SERVICE SERVER

(75) Inventor: Yasuhiro Shinkai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 629 days.

(21) Appl. No.: 11/189,757

(22) Filed: Jul. 27, 2005

(65) Prior Publication Data

US 2006/0022035 A1    Feb. 2, 2006

(30) Foreign Application Priority Data

Jul. 28, 2004  (JP) .............................. 2004-220306

(51) Int. Cl.
 *G06K 15/00* (2006.01)
 *G06F 17/00* (2006.01)
(52) U.S. Cl. ...................... 235/383; 235/375
(58) Field of Classification Search ................. 235/375, 235/383

See application file for complete search history.

(56) References Cited

U.S. PATENT DOCUMENTS 6,646,754 B1 * 11/2003 Redd et al. ................. 358/1.13
6,785,739 B1 * 8/2004 Tutt et al. ................... 709/245
6,943,866 B2 * 9/2005 Redd et al. .................... 355/40
6,999,117 B2 * 2/2006 Yamazaki ................ 348/222.1
2005/0041120 A1 * 2/2005 Miller ......................... 348/239

FOREIGN PATENT DOCUMENTS

JP   2001-51368 A    2/2001
JP   2002-330371 A   11/2002

* cited by examiner

*Primary Examiner*—Karl D Frech
*Assistant Examiner*—April A Taylor
(74) *Attorney, Agent, or Firm*—Birch, Stewart, Kolasch & Birch, LLP

(57) ABSTRACT

The present invention provides a point-of-sales terminal capable of communicating with a service server in which voice data about image data is stored, via a network, the point-of-sales terminal comprising an image data input device which inputs a user's image data, a voice data input device which inputs voice data about the image data, a voice data sending device which sends the voice data to the service server, an access code receiving device which receives an access code including access information for accessing the voice data from the service server, and a printing device which prints the image data and the access code on a print medium.

29 Claims, 15 Drawing Sheets

FIG.5

VOICE DATA DATABASE

| VOICE DATA ID | VOICE DATA FILENAME | URL OF VOICE DATA STORAGE LOCATION |
|---|---|---|
| 00001 | 00001.wav | URL:http://abcde.jp/00001 |
| 00002 | 00002.wav | URL:http://abcde.jp/00002 |
| ... | ... | ... |
| 09999 | 09999.wav | URL:http://abcde.jp/09999 |

FIG.6

ACCOUNTING INFORMATION DATABASE

| VOICE DATA ID | PRINT USAGE FEE | CONTINUED STORAGE FEE | REMAINING ACCOUNTING FEE | CREDIT REGISTRANT | CREDIT CARD NUMBER | EXPIRING DATE OF CREDIT |
|---|---|---|---|---|---|---|
| 00001 | ¥200 | ¥100 | ¥900 | (NULL) | (NULL) | (NULL) |
| 00002 | ¥200 | ¥100 | (NULL) | FUJI TARO | 0001 0123 1234 9876 | 07/06 |
| ... | ... | ... | ... | ... | ... | ... |
| 09999 | ¥200 | ¥100 | ¥100 | (NULL) | (NULL) | (NULL) |

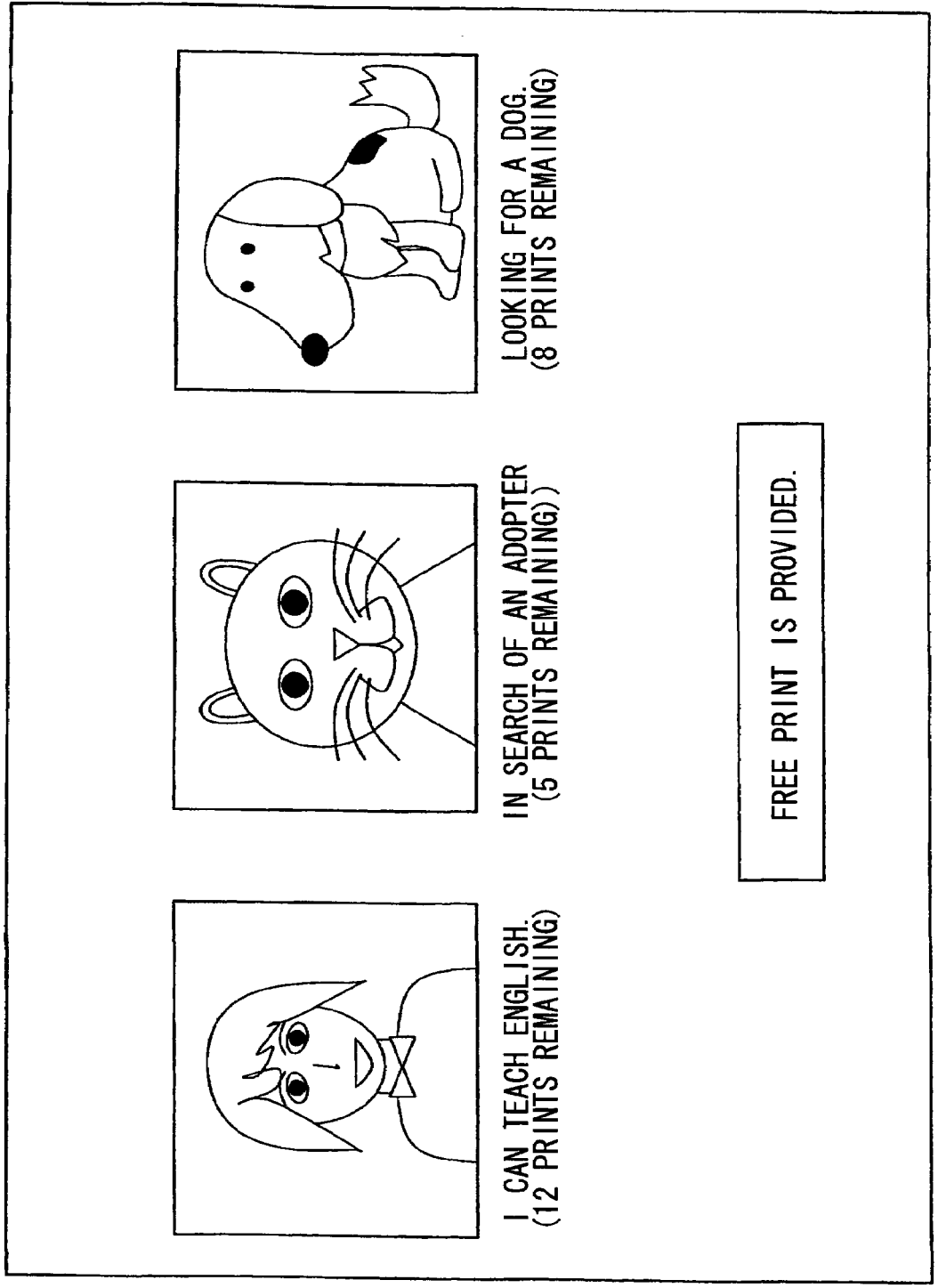

POINT-OF-SALES TERMINAL AND SERVICE SERVER

BACKGROUND OF THE INVENTION

1. Field of the Invention

The present invention relates to a point-of-sales terminal and a service server, and in particular to automatic vending of a print of an image of a user by a point-of-sales terminal, and a service server which accepts uploaded voice data about an image of a user from the point-of-sales terminal.

2. Related Art

There has been proposed an automatic photo-print vending machine which takes an image of a user and prints it on a print seal (Japanese Patent Application Laid-Open No. 2002-330371).

There has also been proposed a talk-photo creation system for printing voice data on a photo print as a barcode so that voice is emitted by reading the barcode with a barcode reader and converting it to voice (Japanese Patent Application Laid-Open No. 2001-51368).

SUMMARY OF THE INVENTION

The automatic photo-print vending machine described in Japanese Patent Application Laid-Open No. 2002-330371 enables a user to easily take a picture and perform desired processing on the taken image. However, description is not made on the technique and mechanism for inputting voice data about the user image in Japanese Patent Application Laid-Open No. 2002-330371.

In order to emit voice from a photo print created by the talk-photo creation system described in Japanese Patent Application Laid-Open No. 2001-51368, a dedicated reproduction apparatus for reading the barcode on the photo print, converting it to voice and emitting the voice is required. Furthermore, the amount of information which can be recorded by means of a barcode on a photo print is not enough to sufficiently reproduce human voice or perform long-time reproduction.

The present invention has been made in consideration of the above situation, and its object is to provide a point-of-sales terminal capable of printing a print of an image of a user from which voice data can be reproduced, and a service server capable of distributing voice data.

In order to achieve the above object, a first aspect of the present invention is a point-of-sales terminal capable of communicating with a service server in which voice data about image data is stored, via a network, the point-of-sales terminal comprising: an image data input device which inputs image data of a user; a voice data input device which inputs the voice data about image data; a voice data sending device which sends the voice data to the service server; an access code receiving device which receives an access code including access information for accessing the voice data from the service server; and a printing device which prints the image data of a user and the access code on a print medium.

That is, image data of a user and voice data about the image data of a user are inputted from the point-of-sales terminal, and the voice data is sent to the service server. Then, an access code (such as a barcode and a two-dimensional code) is received which includes access information (URL) for accessing voice data and which is issued by the service server, and this access code and the image of a user are printed on a print medium. A photo print including an access code which has been printed in this way is discharged from the print discharge slot of the point-of-sales terminal. When access occurs based on the access information obtained by reading the access code on the photo print with the use of a user terminal having an access code reading function, voice data managed in association with the access information is read from a voice data database and sent to the user terminal which has accessed. Thus, a user can use an access code printed on a photo print to easily obtain voice data about the image of a photo print.

A second aspect of the present invention is the point-of-sales terminal according to the first aspect, wherein the image data input device comprises at least one of an imaging device which takes an image of a user or an image data reading device which reads from an image recording medium held by a user.

A third aspect of the present invention is the point-of-sales terminal according to any of the first to second aspects, wherein the voice data input device comprises at least one of an audio-recording device which audio-records a user's voice, and a voice message storage device in which multiple voice messages are recorded in advance and a voice message selection device which selects a voice message desired by a user.

A fourth aspect of the present invention is the point-of-sales terminal according to any of the first to third aspects, further comprising: an accounting information input device which inputs accounting information about a user; and an accounting information sending device which sends the accounting information in association with the voice data to the service server.

That is, the amount of money dropped into an accounting device of the point-of-sales terminal by a user is counted and inputted as accounting information. Alternatively, credit information, that is, the registered name, the registrant name, card number and expiring date of a credit card inputted from the operation section of the point-of-sales terminal may be used as the accounting information. Thereby, the user can utilize storage in the voice data database for a period corresponding to the amount dropped in by the user. In the case of a user who has inputted credit information as the accounting information, he can utilize storage of the voice data database for the period while credit settlement is available or for the period until the user notifies termination of usage of the service.

A fifth aspect of the present invention is the point-of-sales terminal according to the fourth aspect, further comprising: a printing control device which prevents the printing device from printing when an access code including a printing-disabled flag is received from the service server.

That is, when the point-of-sales terminal prints on a print medium, the service server refers to the accounting information. If the accounting information is 0 or less, the service server determines that usage of print should be disabled and sends an access code including a printing-disabled flag to the point-of-sales terminal. If receiving an access code including a printing-disabled flag, the point-of-sales terminal outputs a control signal indicating that printing is disabled to the printing device, so that printing in the case of the accounting information of 0 or less can be prevented. Furthermore, by the service server managing the accounting information including the remaining amount of the print usage fee, it is possible for a user to print a print without dropping a coin into the accounting device if the print usage fee is less than the remaining amount.

A sixth aspect of the present invention is the point-of-sales terminal according to any of the first to fifth aspects, further comprising: a publication instruction device which causes a user to select whether to publish image data and voice inputted by the user to other users and instruct the selection; a storage device which stores image data and voice data instructed to be published and an access code; and a public data data output device which displays the image data and voice data instructed to be published at a predetermined time interval.

That is, by a user who wants to publish image data and voice data pressing the publication button on the operation section, other users can browse and display the image data and reproduce the voice data. The image and the voice data are repeatedly displayed and reproduced at a predetermined time interval. If another user desires reproduction of the displayed image data and the voice data, he can print a print thereof. Thereby, the point-of-sales terminal functions as an electronic bulletin board, and a print medium on which a print is printed can be used as a flier capable of reproducing a voice message.

A seventh aspect of the present invention is a service server which receives voice data about image data from a point-of-sales terminal of the first aspect via a network and stores the voice data, the service server comprising: a receiving device which receives the voice data from the point-of-sales terminal; a database which manages the voice data; an access information issuance device which issues access information for accessing the voice data; an access code generation device which generates an access code including the access information; and an access code sending device which sends the access code.

That is, voice data is received from the point-of-sales terminal via a network and managed by the voice data database. Access information indicating the storage location of voice data which is used for accessing the voice data is issued, and an access code including this access information is generated. The generated access code is sent to the point-of-sales terminal which has sent the voice data. Thereby, the point-of-sales terminal can print the access code and image data of a user on a print medium.

An eighth aspect of the present invention is the service server according to the seventh aspect, further comprising: an accounting information receiving device which receives accounting information associated with the voice data from the point-of-sales terminal; and an accounting information database which manages the accounting information.

A ninth aspect of the present invention is the service server according to the eighth aspect, further comprising: an accounting information database update device which refers to the accounting information database, subtracts a voice data storage usage fee from the accounting information for a predetermined time period and updates the accounting information; and a deletion device which deletes the voice data and the accounting information if the accounting information is less than the voice data storage usage fee, or 0 or less.

A tenth aspect of the present invention is the service server according to any of the eighth to ninth aspects, further comprising: an accounting information database update device which refers to the accounting information database, subtracts a print usage fee from the accounting information and updates the accounting information; and an access code generation device which generates an access code including a printing-disabled flag if the accounting information is less than the print usage fee, or 0 or less.

That is, when the point-of-sales terminal prints on a print medium, the service server refers to the accounting information, subtracts the print usage fee from the accounting information. If the updated accounting information is less than the print usage fee, or 0 or less, then the service server determines that usage of print should be disabled and sends an access code including a printing-disabled flag to the point-of-sales terminal. Thereby, it is possible for a user to print a print without dropping a coin into the accounting device if the print usage fee is less than the remaining amount. Furthermore, if another user wants to print a print of public data, that other user can print a print without dropping a coin into the accounting device if the print usage fee of the accounting information of the public data is less than the remaining amount.

According to the present invention, it can be realized to provide a point-of-sales terminal capable of printing a print of an image of a user from which voice data can be reproduced and a service server capable of distributing the voice data. Furthermore, by distributing the photo print to other users, the other users who have received the photo print can access the service server from their user terminal capable of reading an access code to reproduce voice data about the image data of a user printed on the photo print.

BRIEF DESCRIPTION OF THE DRAWINGS

FIG. 5 shows an example of data managed by a voice data database;

FIG. 6 shows an example of data managed by an accounting information database;

FIG. 15 is an example of simultaneous display of multiple images which have been instructed to be published.

DETAILED DESCRIPTION OF THE PREFERRED EMBODIMENTS

Preferred embodiments of the point-of-sales terminal and the service server according to the present invention will be described in detail below in accordance with the accompanying drawings.

Figure 1:
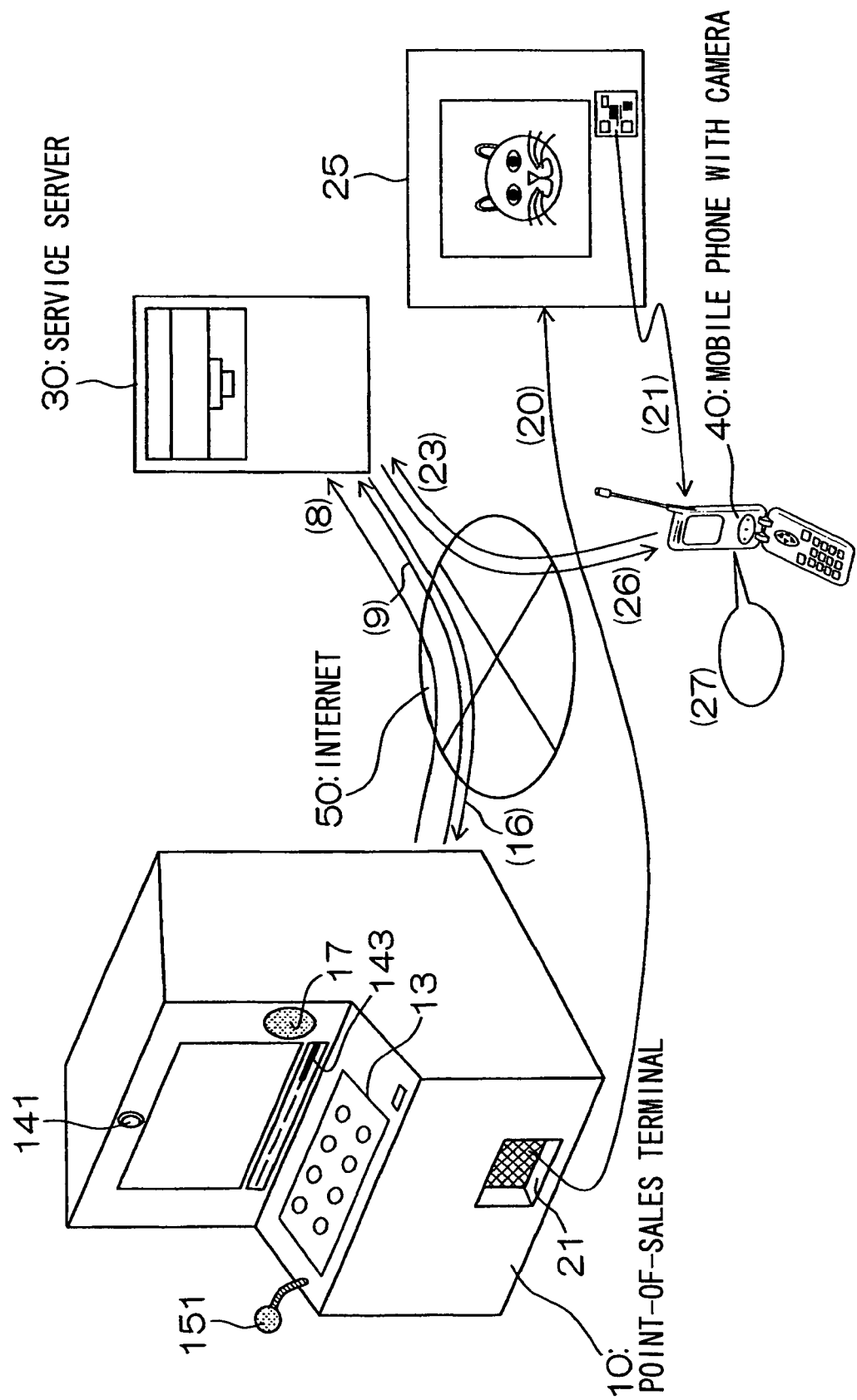
FIG. 1 is a system configuration diagram for realizing a point-of-sales terminal and a service server according to the present invention.

FIG. 1 is a system configuration diagram for realizing the point-of-sales terminal and the service server according to the present invention. This system is composed of a point-of-sales terminal 10, a service server 30 and a mobile phone with a camera 40 as a user terminal, which are mutually communicable via the Internet 50.

Figure 2:
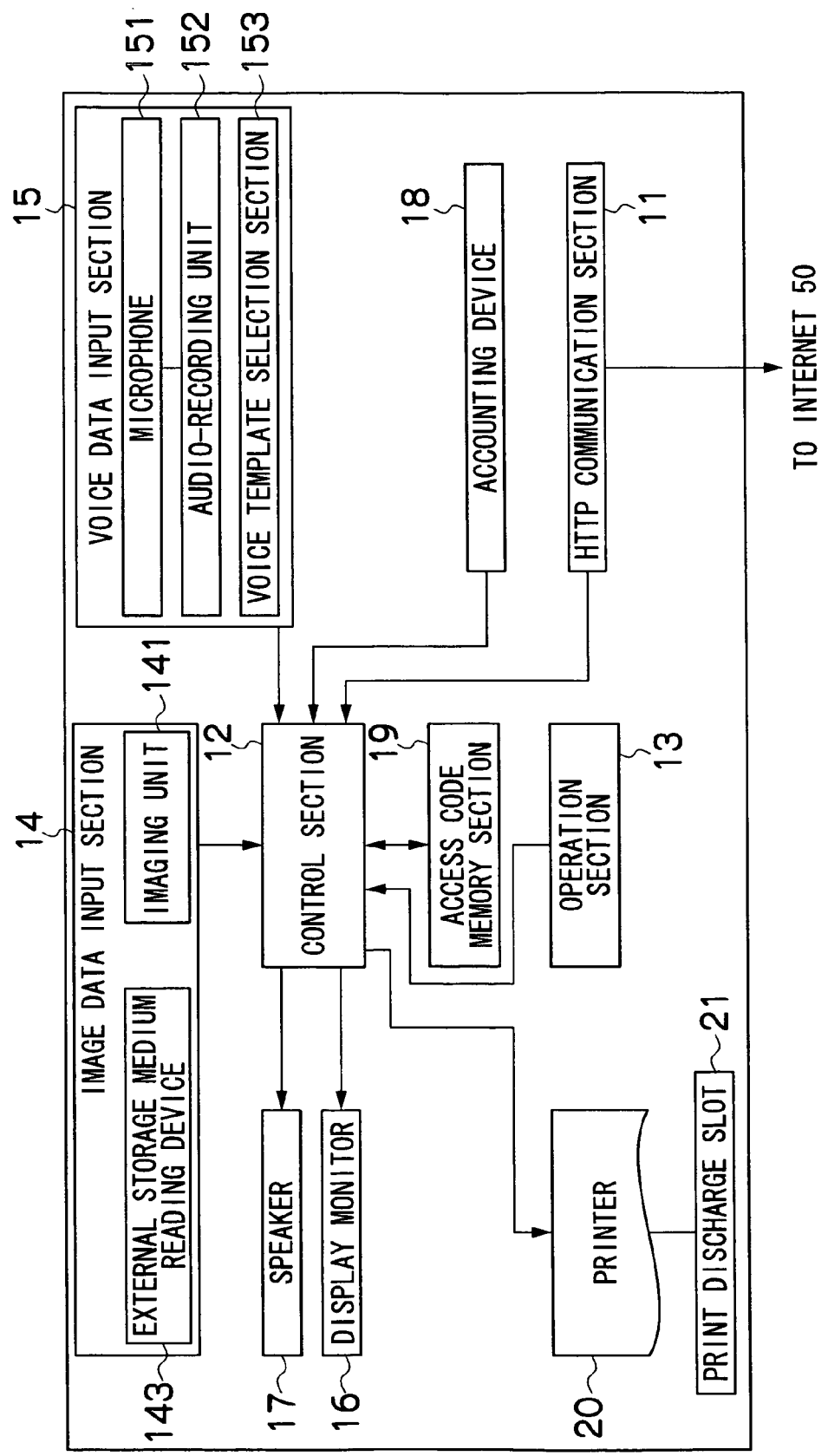
FIG. 2 is a block diagram showing an embodiment of the point-of-sales terminal.

FIG. 2 is a block diagram showing an example of configuration of the point-of-sales terminal 10.

As shown in the figure, the point-of-sales terminal 10 is composed mainly of an HTTP (hypertext transfer protocol) communication section 11, a control section 12, an operation section 13, an image data input section 14, a voice data input section 15, a display monitor 16, a speaker 17, an accounting device 18, an access code memory section 19 and a printer 20.

The HTTP communication section 11 is for communicating with a service server via the Internet 50. It sends voice data and accounting information to the service server 30 and receives an access code and updated accounting information from the service server 30.

The control section 12 is for performing overall control of each section of the point-of-sales terminal. It stores image data inputted from the image data input section 14 and voice data inputted from the voice data input section 15.

The operation section 13 accepts an operation by a user, and sends an instruction made by the user operation to the control section 12. The operation section 13 may be a touch panel attached on the panel of the display monitor or may be a key button switch provided on the case of the point-of-sales terminal 10.

The image data input section 14 is for inputting image data of a user, and is composed of an imaging unit 141 for taking an image of a user on the spot with the use of a camera included in the point-of-sales terminal 10, and an external storage medium reading device 143 for reading from an external storage medium in which image data held by a user is recorded. The image data input section 14 may be composed of only one of the imaging unit 141 and the external storage medium reading device 143.

The voice data input section 15 is for inputting voice data of a user, and is composed of an audio-recording unit 152 for audio-recording a voice message of a user at the spot with the use of a microphone 151 included in the point-of-sales terminal, and a voice template selection section 153 in which multiple voice data to be desired by users are recorded in advance and which is capable of inputting voice data based on selection by a user. The voice data input section 15 may be composed of only one of the audio-recording unit 152 with the microphone 151 included therein and the voice template selection section 153.

The display monitor 16 is for giving an operation instruction to a user or for displaying image data of the user or a voice template to prompt the user to perform operation from the operation section 13. In addition, when the point-of-sales terminal 10 is not used, the display monitor 16 sequentially displays user images which are permitted to be published at a constant interval.

The speaker 17 is for giving an operation instruction to a user or for reproducing a selected voice template and voice data of the user.

The accounting device 18 is for detecting a coin being dropped in by a user and sending the amount dropped in to the control section 12. In addition, it returns change or refunding money in response to a cancel operation by the user.

The access code memory section 19 receives an access code sent from the service server 30 via the HTTP communication section 11 and temporarily stores it.

Figure 3:
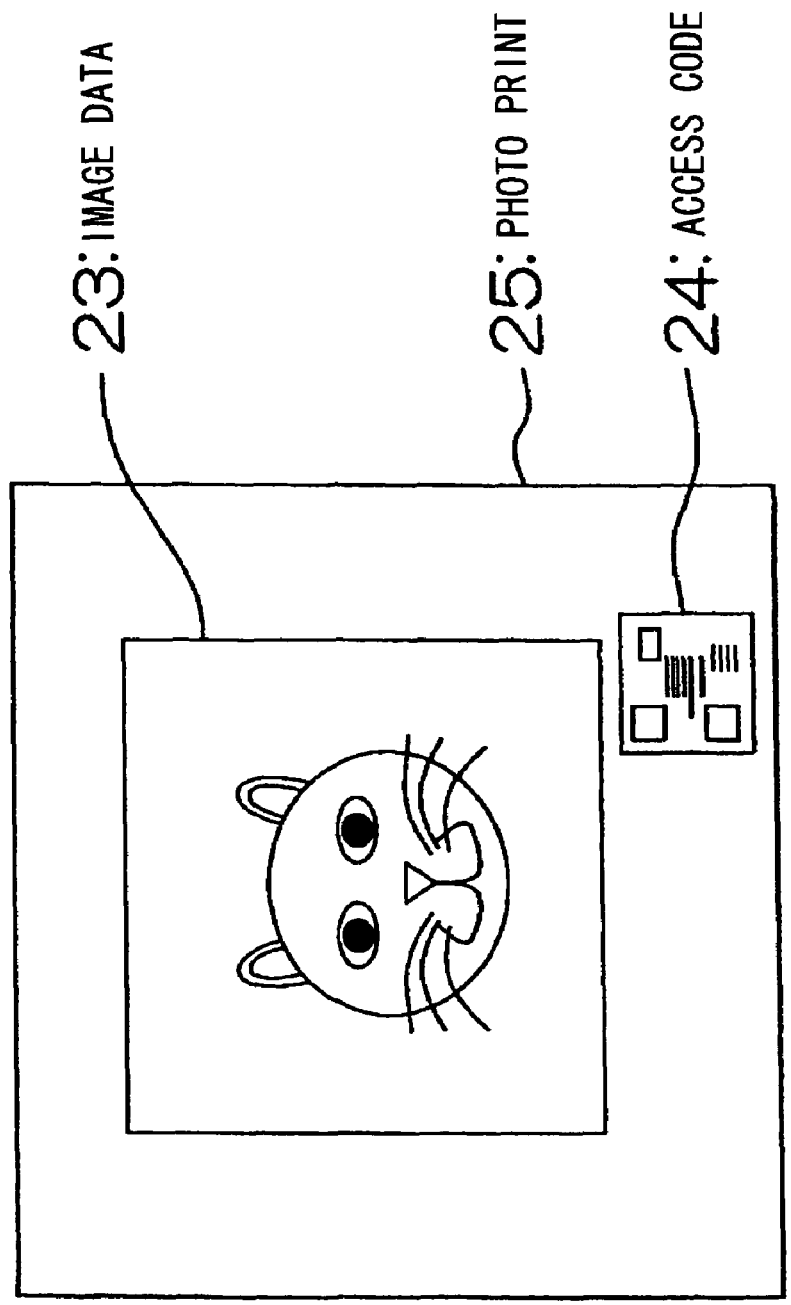
FIG. 3 shows an embodiment of a photo print on which an access code is printed.

As shown in FIG. 3, the received access code 24 is printed on print paper together with image data 23. A photo print 25 on which the image data 23 and the access code 24 are printed is discharged from a print discharge slot 21.

Figure 4:
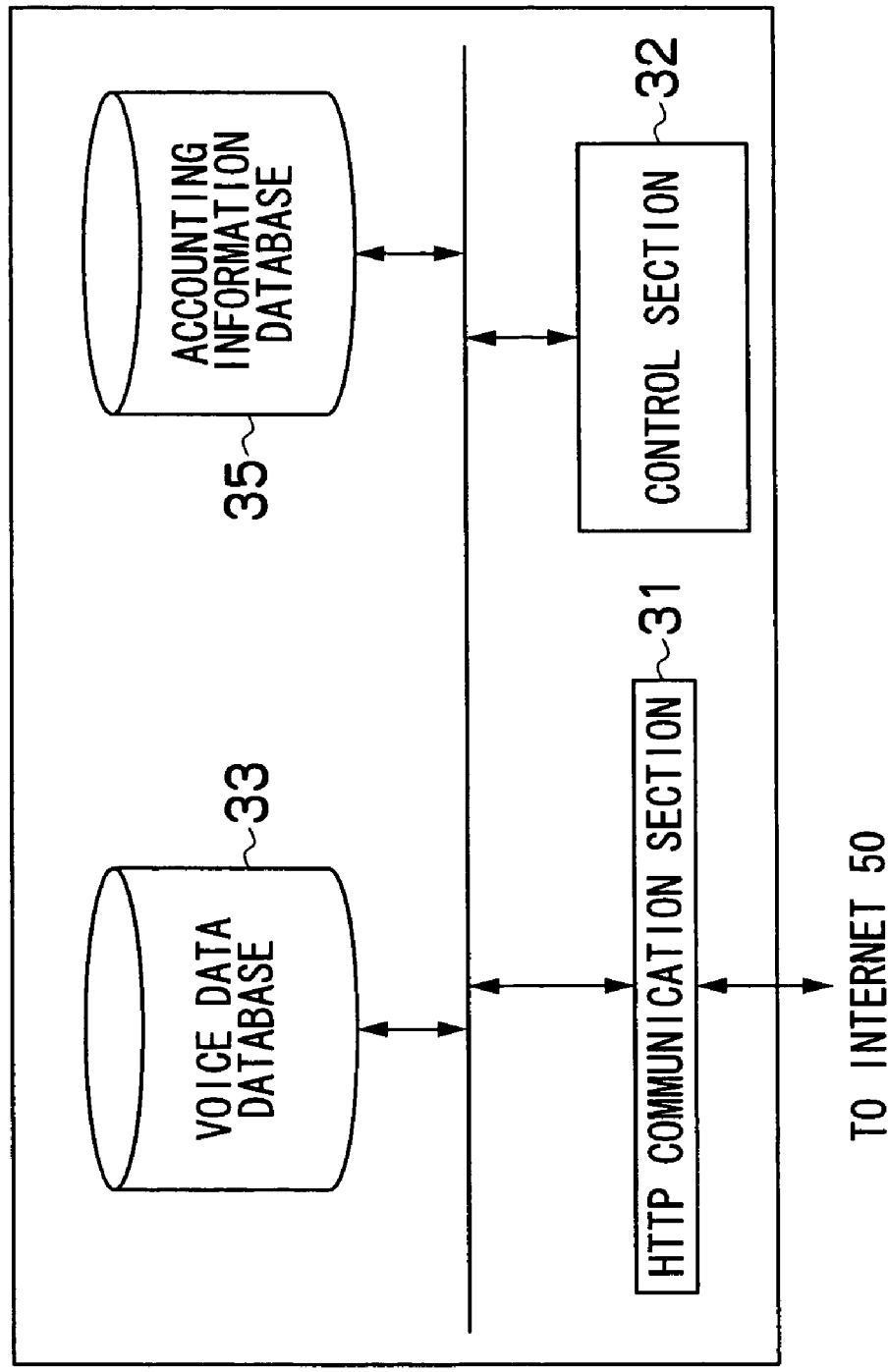
FIG. 4 is a block diagram showing an embodiment of the service server.

FIG. 4 is a block diagram showing an example of configuration of the service server 30.

As shown in FIG. 4, the service server 30 is composed mainly of an HTTP communication section 31, a control section 32, a voice data database 33 for registering and managing voice data of a user uploaded from a point-of-sales terminal, and an accounting information database 35 for managing accounting information required for storing the voice data.

The control section 32 is for performing overall control of each section in the service server 30 and includes viewing software utilizing a browser, management software, URL (uniform resource locator) issuance software and the like. The control section 32 registers voice data received via the HTTP communication section 31 with the voice data database 33 as shown in FIG. 5, issues a URL indicating the storage location of the voice data and generates, from the character string of the URL, an access code (for example, a two-dimensional code such as a QR code) indicating the character string. Then, the control section 12 sends the access code to the point-of-sales terminal 10 which has sent the voice data, via the HTTP communication section 31.

As shown in FIG. 6, in the accounting information database 35, there are registered accounting information associated with voice data registered with the voice data database 33. A print usage fee, storage fee required for storage voice data and prepaid fee which has already been paid are also registered. In the case where accounting information sent from a point-of-sales terminal includes credit information, the credit information is also registered.

When receiving an IP address of the URL for accessing voice data and an HTTP request via the HTTP communication section 31, the control section 32 reads voice data identified by the received IP address and HTTP request from among information in the voice data database 33, and sends the voice data to the request-source equipment which has accessed.

In the accounting information database 35, the storage fee required for storage of voice data is updated at a predetermined time interval (for example, each week, each month or the like). The amount obtained by subtracting the storage fee from the prepaid fee already paid is set as a new prepaid fee. If the prepaid fee is less than the storage fee or is a minus value, the control section 32, assuming that the voice data storage service is not to be continued, deletes the voice data from the voice data database 33. The updated prepaid fee is updatedly registered with the accounting information database 35 as updated accounting information, and the updated accounting information is sent to the point-of-sales terminal 10 which has sent the voice via the HTTP communication section 31, via the HTTP communication section 31.

The mobile phone with a camera 40 (hereinafter referred to simply as "the mobile phone") has not only a normal conversation function but also an e-mail function and a function of accessing a Web site of a WWW server by inputting a URL. The mobile phone 40 has a function of recognizing an access code (for example, a two-dimensional code such as a QR code) printed on a photo print and decoding the recognized access code to obtain a URL. By using these access code decoding function, URL acquisition function and Web site access function, it is possible to receive and reproduce voice data on the service server from an access code on print paper printed by the point-of-sales terminal 10.

FIGS. 1, 7, 8, 9, 10 and 11 show a first embodiment of the point-of-sales terminal and the service server of the present invention. Description will be made with reference to these drawings on the flow of a service from input of image data to creation of a photo print and provision of voice data associated with the photo print to a user.

Figure 7:
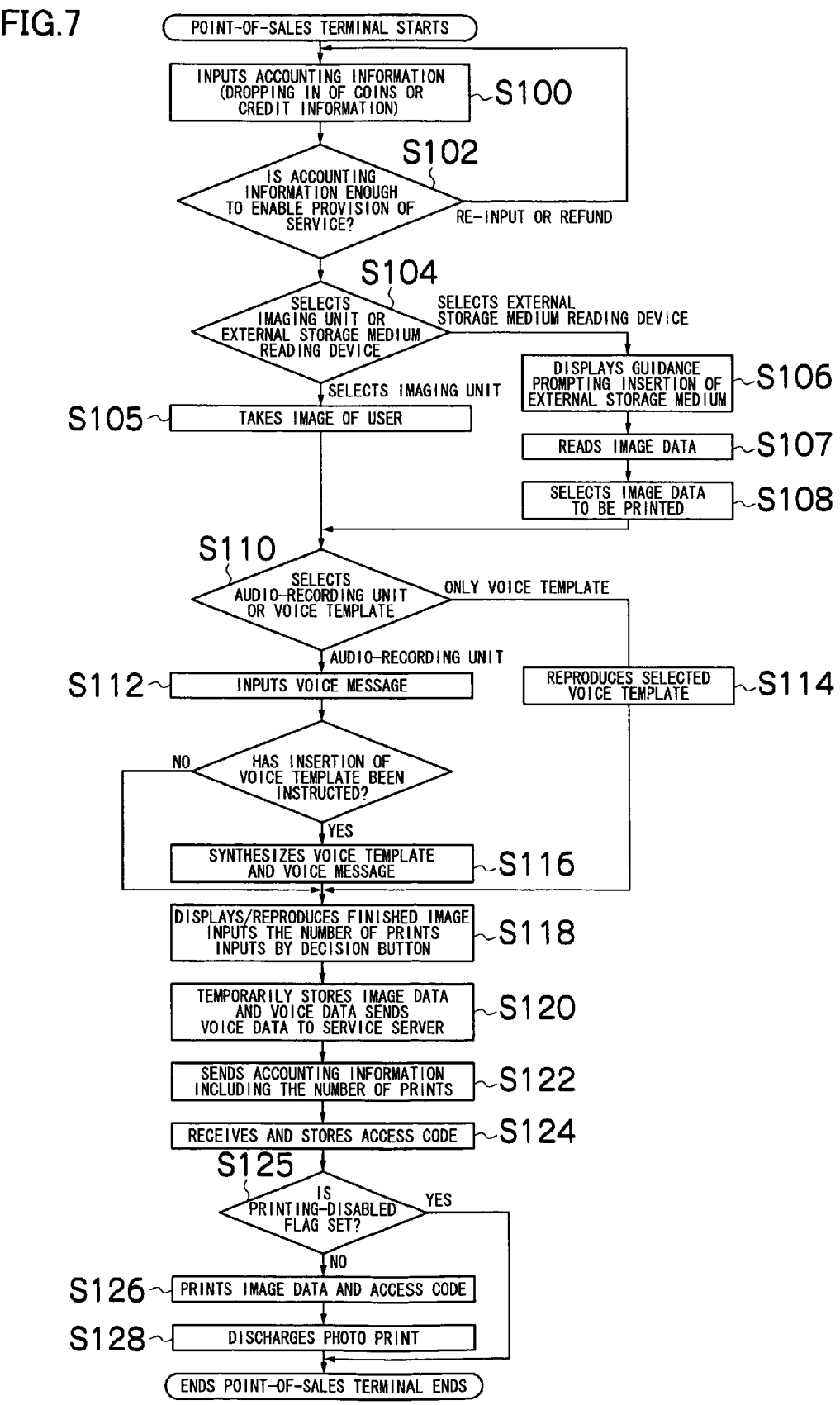
FIG. 7 is a flowchart showing the operation of the point-of-sales terminal when image data and voice data are registered.

(1) As shown in FIG. 7, a user drops a predetermined number of coins into the accounting device 18 of the point-of-sales terminal 10, and accounting information is obtained. Alternatively, credit information, that is, the registrant name, card number and expiring date of a credit card inputted from the operation section 13 of the point-of-sales terminal 10 may be used as the accounting information (S100).

(2) The control section 12 receives the accounting information from the accounting device 18 or the accounting information including credit information from the operation section 13, and determines whether the amount enough to provide the service has been dropped in or whether the credit information indicates that settlement can be properly performed. If it is possible to provide the service, the process proceeds to step S104 (S102).

(3) The user selects whether to use the imaging unit 141 for taking an image of the user on the spot or the external storage medium reading device 143 for reading from an external storage medium on which image data of the user is recorded, of the image data input section 14 (S104).

(4) If the user selects the imaging unit 141, then the imaging unit 141 is activated to take an image of the user (S 105). If the user selects the external storage medium reading device 143, then a guidance prompting the user to insert an external storage medium is displayed on the display monitor 16 (S 106). Then, after confirming that an external storage medium has been inserted into a predetermined insertion slot, image data is read from the external storage medium (S 107), and causes the user to select image data to be printed (S 108).

(5) The user is caused to select whether to use the audio-recording unit 152 of the voice data input section 15 or to input, as voice data, a voice template selected from multiple voice templates in which voice data to be desired by users has been recorded (S110). It is also possible to reproduce a voice template during recording of a voice message of the user by the audio-recording unit 152. In this case, the voice template functions as a sound effect for the voice message of the user.

Figure 8:
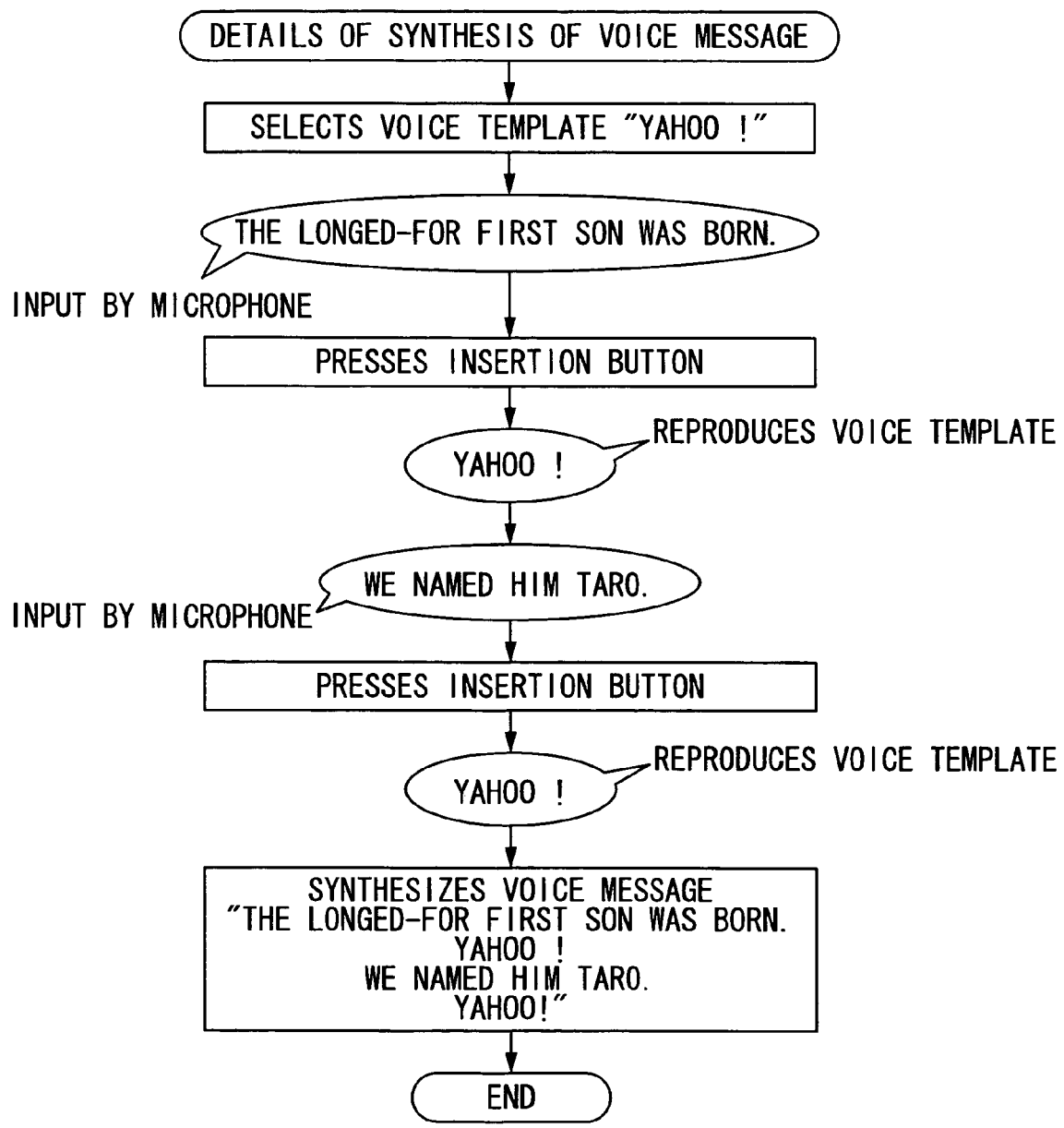
FIG. 8 is a detailed flowchart for synthesizing a voice message.

(6) If the user selects the audio-recording unit 152, then the audio-recording unit 152 is activated, and the user is caused to input a voice message using the microphone 151 (S112). If the user selects use of only a voice template, then the selected voice template is used as voice data (S 14). If the user selects to use both of the audio-recording unit 152 and a voice template, then the voice template selected by the user is synthesized with a voice message at a timing of the user's instruction to insert the voice template during input of the user's voice message (S116). FIG. 8 shows an example of a procedure for synthesizing a voice template and a voice message.

(7) A finished image is displayed/reproduced for the user, and the user is caused to input the number of prints and press a decision button (S118).

(8) The control section 12 temporarily stores the image data 23 and the voice data, and sends the voice data to the service server 30 via the HTTP communication section 11 (S120 and FIG. 1).

(9) The control section 12 sends accounting information including the number of prints specified by the user to the service server 30 via the HTTP communication section 11 (S122 and FIG. 1).

Figure 9:
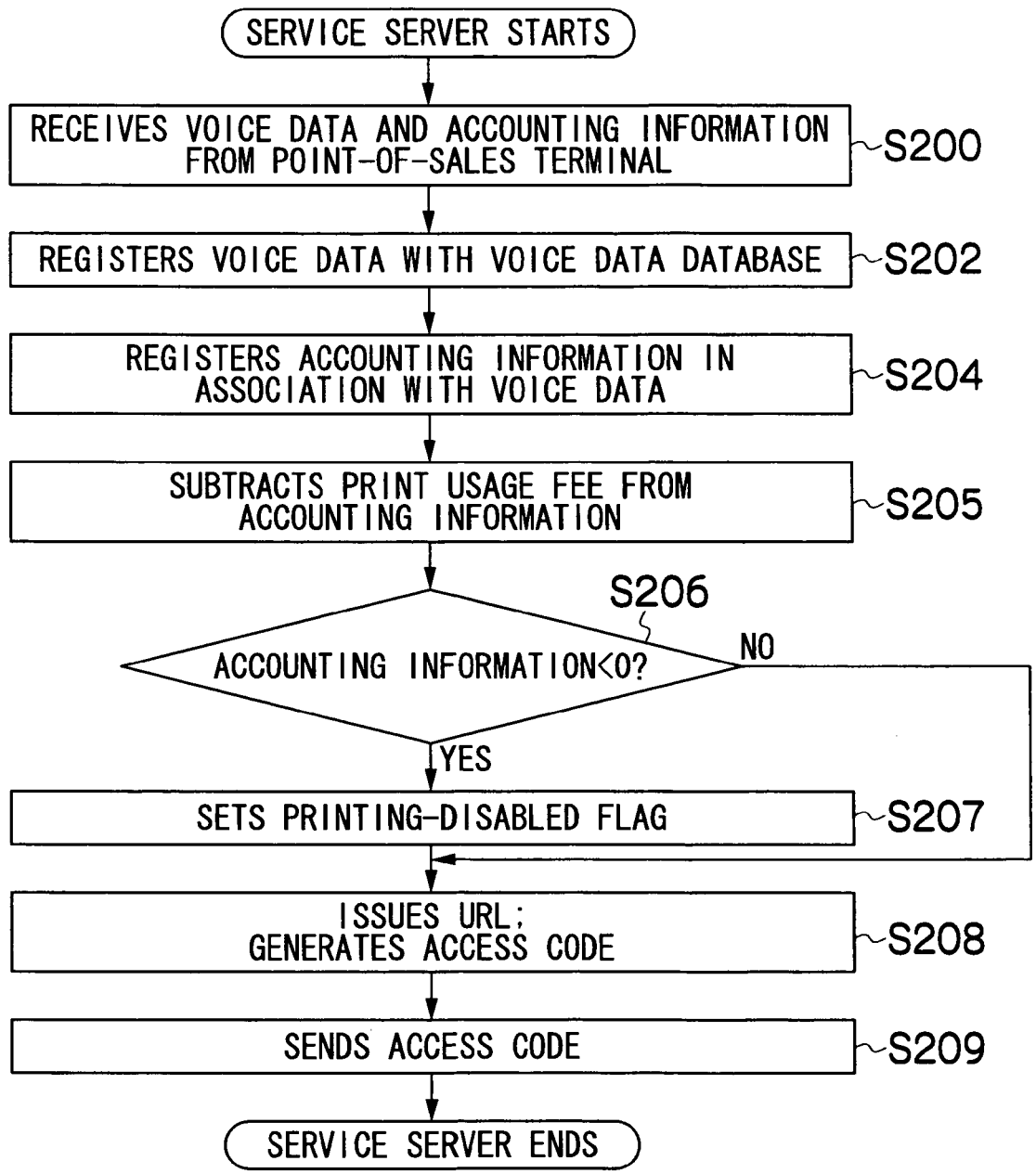
FIG. 9 is a flowchart showing the operation of the service server when image data and voice data are registered.

(10) As shown in FIG. 9, the control section 32 of the service server 30 receives the voice data and the accounting information from the point-of-sales terminal 10 via the HTTP communication section 31 (S200).

(11) The control section 32 of the service server 30 registers the received voice data with the voice data database 33 and manages it (S202).

(12) The control section 32 of the service server 30 registers and manages the received accounting information in association with the voice data (S204).

(13) The control section 32 of the service server 30 subtracts the print usage fee from the accounting information to update the accounting information (S205).

(14) The control section 32 of the service server 30 determines whether the updated accounting information is less than 0 or not (S206). If it is less than 0, then the control section 32 sets a printing-disabled flag (S207).

(15) The control section 32 of the service server 30 issues a URL indicating the storage location of the voice data, and generates, from the character string of the URL, an access code 24 (for example, a two-dimensional code such as a QR code) indicating the character string (S208).

(16) The service server 30 sends the generated access code 24 to the point-of-sales terminal 10 which has sent the voice data, via the HTTP communication section 31 (S209 and FIG. 1).

(17) Returning to FIG. 7, the point-of-sales terminal 10 receives the access code 24 via the HTTP communication section 11, and stores the access code 24 in the access code memory section 19 (S124).

(18) If receiving an access code including a printing-disabled flag, the control section 12 of the point-of-sales terminal 10 terminates the process without printing a photo print (S125).

(19) The control section 12 of the point-of-sales terminal 10 creates a photo print 25 on which the image data 23 which has been temporarily stored at step S120 and the access code 24 are printed (S126).

(20) The photo print 25 is discharged from the print discharge slot of the point-of-sales terminal 10 and obtained by the user (S128 and FIG. 1). The photo print 25 may be handed to another user or may be held by the user himself.

Next, description will be made on the case where voice is reproduced with the use of the photo print 25.

Figure 10:
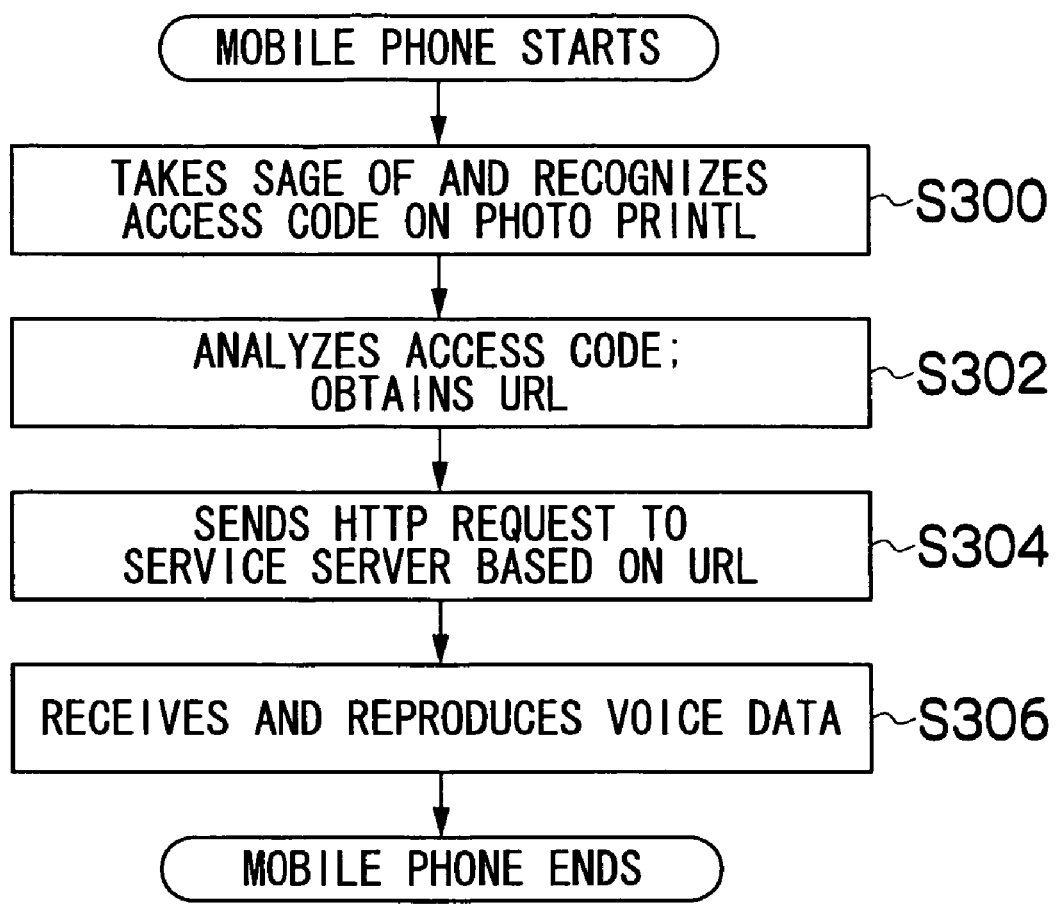
FIG. 10 is a flowchart showing the operation of a mobile phone when voice data is accessed.

(21) As shown in FIG. 10, the user who has received the photo print 25 takes an image of the access code 24 printed on the photo print 25 with the mobile phone 40 to cause the mobile phone 40 to recognize the access code 24 (S300 and FIG. 1).

(22) The mobile phone 40 decodes the recognized access code and obtains a URL (S302).

(23) Using the Web site access function, the mobile phone 40 sends an HTTP request to a service server based on the obtained URL and accesses thereto (S304).

(24) The control section 32 of the service server 30 receives the HTTP request from the mobile phone 40 via the HTTP communication section (S250).

Figure 11:
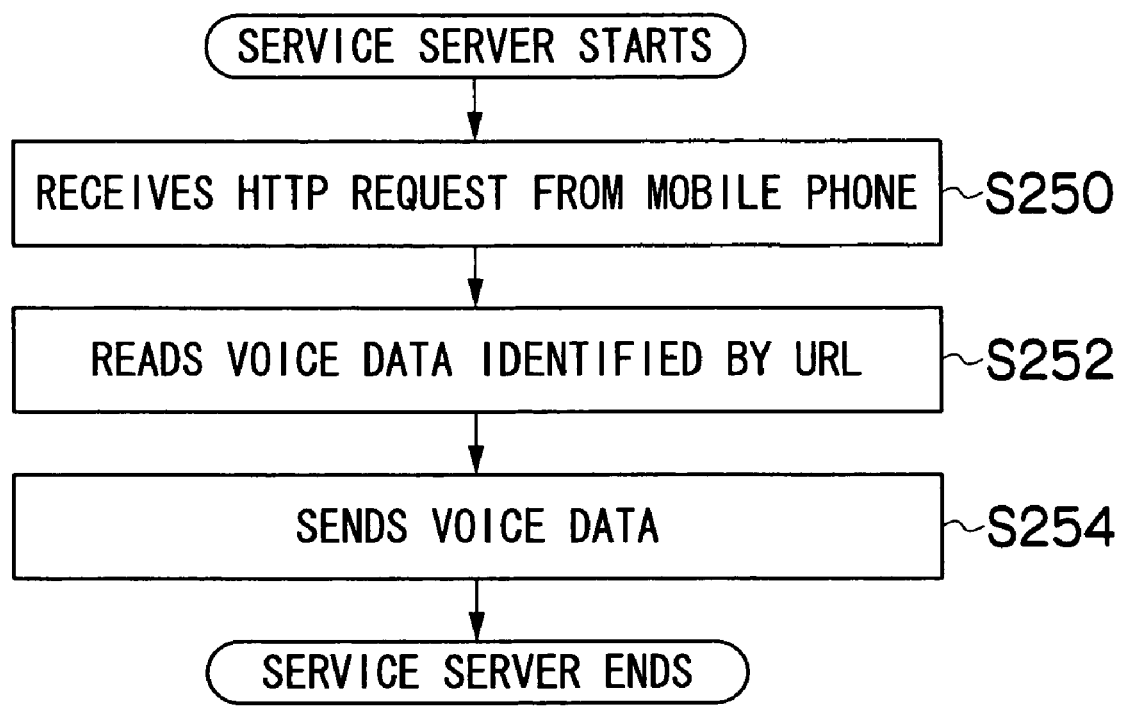
FIG. 11 is a flowchart showing the operation of the service server when voice data is accessed.

(25) As shown in FIG. 11, the control section 32 of the service server 30 reads voice data identified by the URL from the voice data database 33 (S252).

(26) The control section 32 of the service server 30 sends the voice data to the mobile phone 40 which has accessed (S254 and FIG. 1).

(27) Returning to FIG. 10, the mobile phone 40 reproduces the voice data received from the service server 30 (S306 and FIG. 1).

FIGS. 12, 13, 14, 15 and 16 show a second embodiment of the point-of-sales terminal and the service server of the present invention. In the second embodiment, a user who wants to publish a photo print with a voice message allows a third person (another user) to print the photo without a fee by the user paying the print fee of the photo print. The display monitor 16 of the point-of-sales terminal 10 functions as a bulletin board, and the printed photo print functions as a flier capable of reproducing the voice message.

If the user wants to publish a photo print with a voice message, he operates a "publication" button not shown of the point-of-sales terminal 10. Furthermore, in the case of inputting credit information, the user inputs the number of prints to be printed for free. In the case of dropping money into the accounting device 18, the user drops the amount corresponding to the number of prints to be printed for free.

The flow from input of image data to be published and a voice message at the point-of-sales terminal 10 to print output of a photo print with an access code is similar to the flow in the first embodiment, and therefore, description thereof will be omitted.

Figure 12:
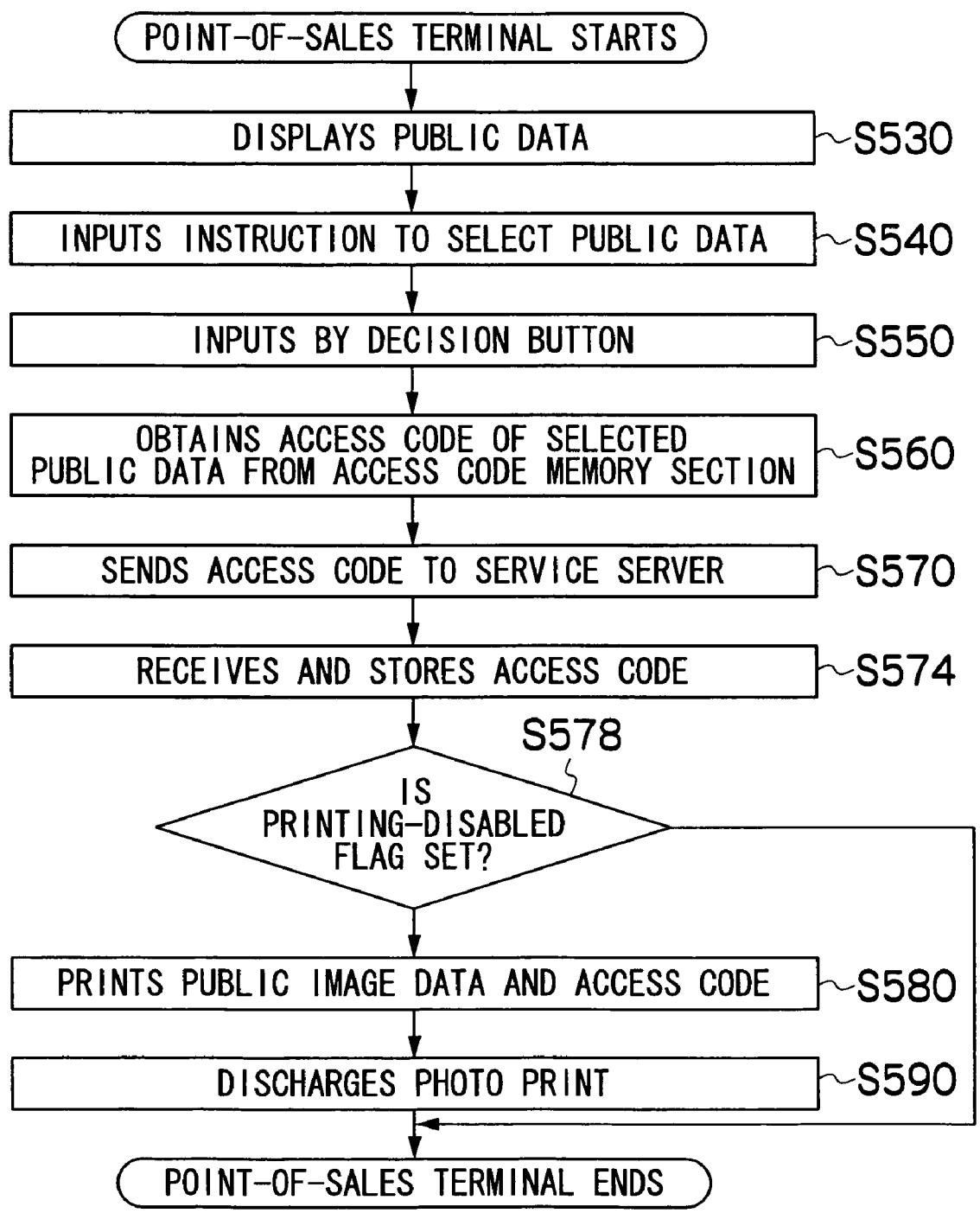
FIG. 12 is a flowchart showing the operation of the point-of-sales terminal when public data is accessed.
Figure 14:
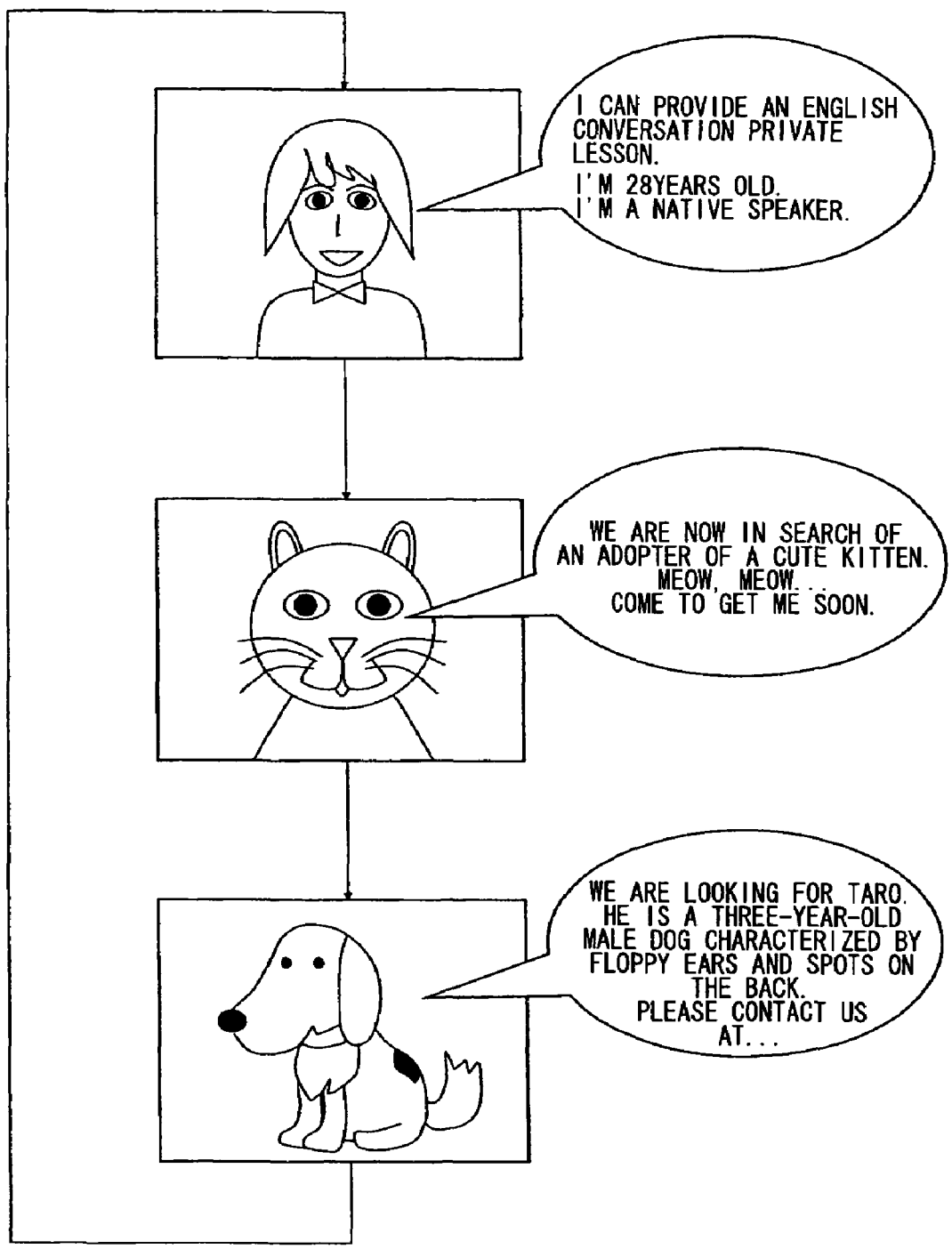
FIG. 14 shows an example of sequential display of multiple images which have been instructed to be published.

(1) In FIG. 12, the image data and the voice data inputted in response to the input of a publication instruction, are sequentially reproduced by the display monitor 16 and the speaker 17 for a predetermined time when the point-of-sales terminal 10 is not used. FIG. 14 shows the case where images and voice messages by three users are repeatedly reproduced.

The reproduction method is not limited to reproducing sequentially images one by one as shown in FIG. 14, and it is also possible to reproduce images by multiple users are reproduced at the same time as shown in FIG. 15. A message may be simultaneously displayed for other users to the effect that a print can be printed for free within the remaining amount of accounting information (S530).

(2) Another user browsing the image data and voice data instructed to be published uses the operation section to instruct selection of desired public data (S540).

(3) A finished image is displayed to that other user and the user is caused to press the decision button (S550).

(4) The control section 12 of the point-of-sales terminal 10 obtains the access code 24 of the selected public data from the access code memory section 19 (S560).

(5) The control section 12 of the point-of-sales terminal 10 sends the access code 24 to the service server 30 via the HTTP communication section 11 (S570).

Figure 13:
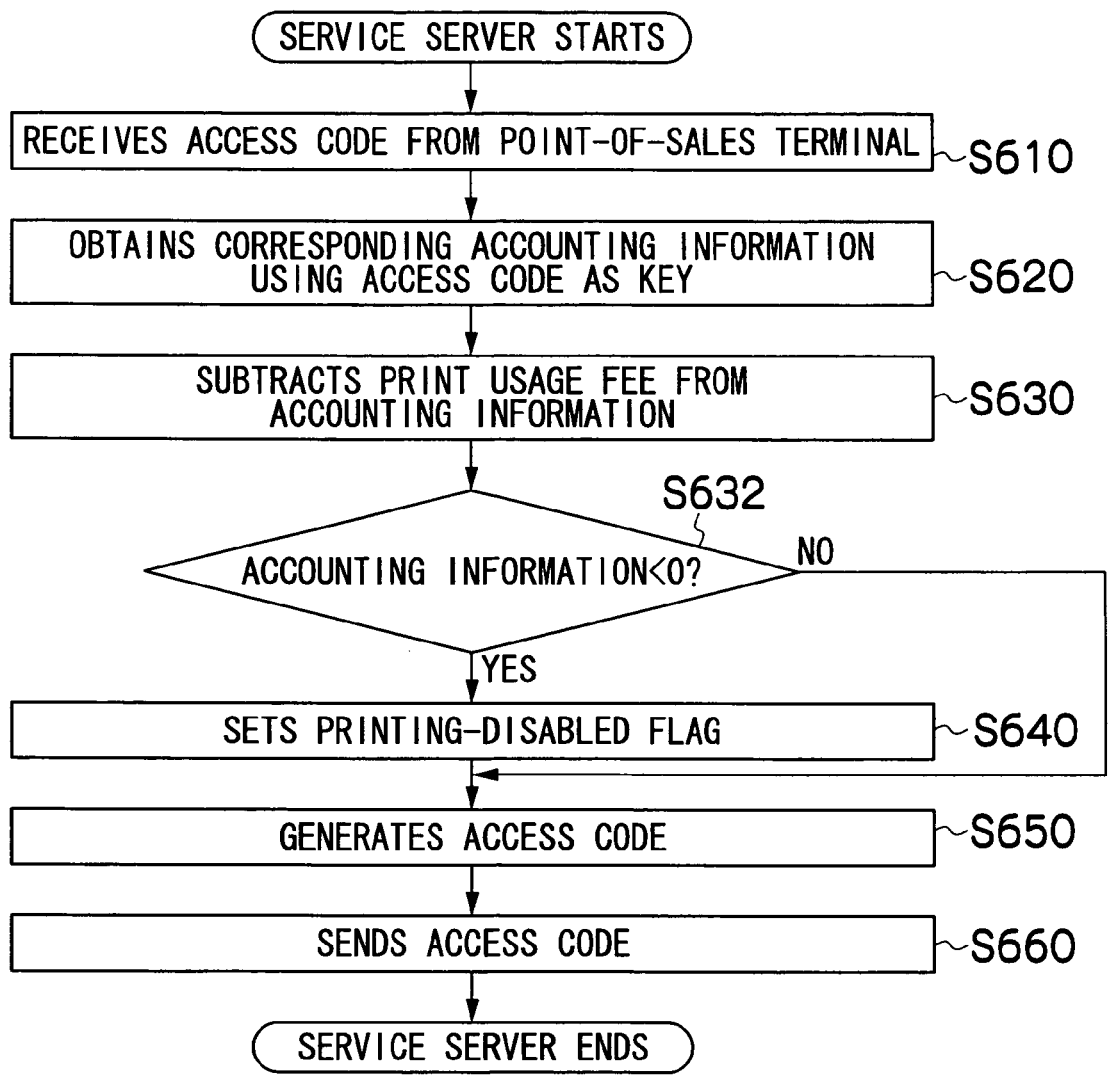
FIG. 13 is a flowchart showing the operation of a service server 30 when public data is accessed.

(6) As shown in FIG. 13, the control section 32 of the service server 30 receives the access code 24 from the point-of-sales terminal 10 via the HTTP communication section 31 (S610).

(7) With the access code 24 as a key, the control section 32 of the service server 30 obtains corresponding accounting information (S620).

(8) The control section 32 of the service server 30 subtracts the print usage fee from the accounting information to update the accounting information (S630).

(9) The control section 32 of the service server 30 determines whether the updated accounting information is less than 0 or not (S632). If it is less than 0, then a printing-disabled flag is set (S640).

(10) The control section 32 of the service server 30 generates an access code 24 (S650).

(11) The control section 32 of the service server 30 sends the generated access code 24 to the point-of-sales terminal 10 which has sent the voice data via the HTTP communication section 31 (S660).

(12) Returning to FIG. 12, the control section 12 of the point-of-sales terminal 10 receives the access code 24 via the HTTP communication section 11, and stores the access code 24 in the access code memory section 19 (S574).

(13) If receiving an access code including a printing-disabled flag, the control section 12 of the point-of-sales terminal 10 terminates the process without printing a photo print (S578).

(14) The control section 12 of the point-of-sales terminal 10 creates a photo print 25 on which the public image data 23 which has been instructed to be printed and the access code 24 are printed (S580).

(15) The photo print 25 is discharged from the print discharge slot of the point-of-sales terminal 10 and obtained by that other user (S590).

What is claimed is:

1. A point-of-sales terminal for communicating with a service server in which voice data about image data is stored, via a network, the point-of-sales terminal comprising:

an image data input device which inputs image data of a user;

a voice data input device which inputs the voice data about image data;

a voice data sending device which sends the voice data to the service server;

an access code receiving device which receives an access code including access information for accessing the voice data from the service server; and a printing device which prints the image data of the user and the access code on a print medium.

2. The point-of-sales terminal according to claim 1, wherein the image data input device comprises at least one of an imaging device which takes the image of a user or an image data reading device which reads from an image recording medium held by the user.

3. The point-of-sales terminal according to claim 2, wherein the voice data input device comprises at least one of an audio-recording device which audio-records the user's voice, and a voice message storage device in which multiple voice messages are recorded in advance and a voice message selection device which selects a voice message desired by the user.

4. The point-of-sales terminal according to claim 3, further comprising:

an accounting information input device which inputs accounting information about the user; and an accounting information sending device which sends the accounting information in association with the voice data to the service server.

5. The point-of-sales terminal according to claim 4, further comprising a printing control device which prevents the printing device from printing when the access code including a printing-disabled flag is received from the service server.

6. The point-of-sales terminal according to claim 5, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

7. The point-of-sales terminal according to claim 3, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

8. The point-of-sales terminal according to claim 4, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

9. The point-of-sales terminal according to claim 2, further comprising:

an accounting information input device which inputs accounting information about the user; and an accounting information sending device which sends the accounting information in association with the voice data to the service server.

10. The point-of- sales terminal according to claim 9, further comprising a printing control device which prevents the printing device from printing when the access code including a printing-disabled flag is received from the service server.

11. The point-of-sales terminal according to claim 10, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

12. The point-of-sales terminal according to claim 9, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

13. The point-of-sales terminal according to claim 2, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

14. The point-of-sales terminal according to claim 1, wherein the voice data input device comprises at least one of an audio-recording device which audio-records the user's voice, and a voice message storage device in which multiple voice messages are recorded in advance and a voice message selection device which selects a voice message desired by the user.

15. The point-of-sales terminal according to claim 14, further comprising:

an accounting information input device which inputs accounting information about the user; and an accounting information sending device which sends the accounting information in association with the voice data to the service server.

16. The point-of-sales terminal according to claim 15, further comprising a printing control device which prevents the printing device from printing when the access code including a printing-disabled flag is received from the service server.

17. The point-of-sales terminal according to claim 16, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

18. The point-of-sales terminal according to claim 15, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

19. The point-of-sales terminal according to claim 14, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

20. The point-of-sales terminal according to claim 1, further comprising:

an accounting information input device which inputs accounting information about the user; and an accounting information sending device which sends the accounting information in association with the voice data to the service server.

21. The point-of-sales terminal according to claim 20, further comprising a printing control device which prevents the printing device from printing when the access code including a printing-disabled flag is received from the service server.

22. The point-of-sales terminal according to claim 21, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

23. The point-of-sales terminal according to claim 20, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

24. The point-of-sales terminal according to claim 1, further comprising:

a publication instruction device which causes the user to select whether to publish image data and voice inputted by the user to other users and instruct the selection;

a storage device which stores image data and voice data instructed to be published and the access code; and a public data output device which displays the image data and voice data instructed to be published at a predetermined time interval.

25. A service server which receives voice data about image data from a point-of-sales terminal of claim 1 via a network and stores the voice data, the service server comprising:

a receiving device which receives the voice data from the point-of-sales terminal;

a database which manages the voice data;

an access information issuance device which issues access information for accessing the voice data;

an access code generation device which generates the access code including the access information; and an access code sending device which sends the access code.

26. The service server according to claim 25, further comprising:

an accounting information receiving device which receives accounting information associated with the voice data from the point-of-sales terminal; and an accounting information database which manages the accounting information.

27. The service server according to claim 26, further comprising:

an accounting information database update device which refers to the accounting information database, subtracts a voice data storage usage fee from the accounting information for a predetermined time period and updates the accounting information; and a deletion device which deletes the voice data and the accounting information if the accounting information is less than the voice data storage usage fee, or 0 or less.

28. The service server according to claim 27, further comprising:

the accounting information database update device which refers to the accounting information database, subtracts a print usage fee from the accounting information and updates the accounting information; and the access code generation device which generates the access code including a printing-disabled flag if the accounting information is less than the print usage fee, or 0 or less.

29. The service server according to claim 26, further comprising:

an accounting information database update device which refers to the accounting information database, subtracts a print usage fee from the accounting information and updates the accounting information; and the access code generation device which generates the access code including a printing-disabled flag if the accounting information is less than the print usage fee, or 0 or less.

* * * * *